UNITED STATES PATENT OFFICE.

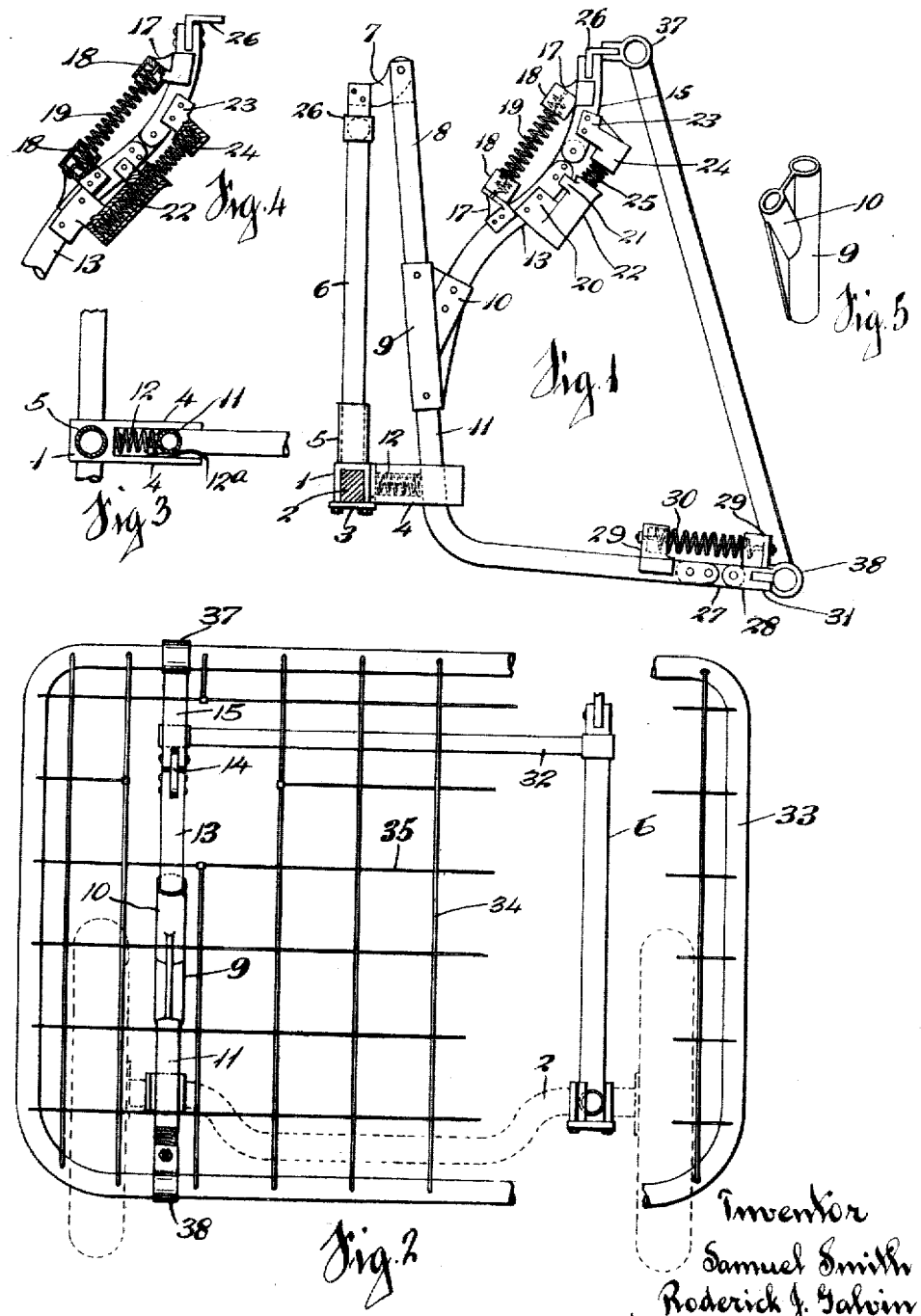

SAMUEL SMITH AND RODERICK J. GALVIN, OF CINCINNATI, OHIO.

FENDER.

1,242,612.     Specification of Letters Patent.     Patented Oct. 9, 1917.

Application filed May 10, 1917. Serial No. 167,789.

*To all whom it may concern:*

Be it known that we, SAMUEL SMITH and RODERICK J. GALVIN, citizens of the United States, and residents of Cincinnati, in the county of Hamilton and State of Ohio, have invented certain new and useful Improvements in Fenders, of which the following is a full, clear, and exact description, reference being had to the accompanying drawings, forming a part of this specification.

Our invention relates to fenders for vehicles, particularly for motor vehicles.

The principal object of our invention is to provide a simple and efficient fender adapted for use on automobiles and other motor vehicles.

A further object of our invention is to provide for vehicles of the nature mentioned, a fender constructed chiefly of metal piping, thereby producing a strong, inexpensive and durable fender.

A further object of our invention is to provide a resilient fender for vehicles.

In the drawings:

Figure 1 is a side view of an automobile fender constructed in accordance with our invention.

Fig. 2 is a front view of the fender showing the same applied to an automobile.

Fig. 3 is a top view of the attaching clip and compression spring housing.

Fig. 4 is a detail of one of the supporting arm joints.

Fig. 5 is a perspective of the socket plate.

Our new fender comprises resilient supporting frames arranged to support the fender proper in suitable position in front of a motor vehicle. Each of said frames comprises a clip 1 arranged to fit over and be secured to the front axle 2 of a motor vehicle in the usual manner by means of a plate 3 and nuts screwed upon the threaded bolt ends of the clip. The said clip has forwardly projecting arms 4 and an upwardly extending sleeve or socket 5. Secured in the socket 5 by means of bolts is an arm 6, the same consisting of a piece of metal piping. Mounted in the upper end of the arm 6 is an angle plate 7, the same being rigidly secured thereto by means of bolts. Pivotally mounted at the free end of the plate 7 is an arm 8, the same having secured to its end a cast socket plate 9, one socket 10 of which extends at an acute angle in an upward direction. Secured in the lower end of the plate 9 is an arm 11, the same passing between the arms 4 on the clip 1 to a point slightly below said arms and then being bent in a forward direction with a slight downward inclination as shown. Mounted in the arms 4 and interposed between the arm 11 and the forward surface of the clip 1 is a compression spring 12, arranged normally to hold the arm 11 in forward position. A lock spring 12$^a$ mounted in the housing composed of arms 4 normally secures the arm 11 in position against the spring 12. Bolted in the upwardly extending socket 10 of the plate 9 is a curved arm 13 constructed of metal piping. Mounted in the free end of the arm 13 by means of bolts is a plate 14, a short arm 15 constructed of metal piping being pivotally secured to the free end of said plate 14. Secured to the arms 13 and 15 are posts 17, each of the said posts being provided with a socket 18 within which the ends of a compression spring 19 are mounted, the said ends being secured to the posts 17. Mounted on the arm 13 by means of wings 20 and 21 is a sleeve or socket 22. Similarly mounted on the short arm 15 is a post 23 having a socket 24. In the sockets 22 and 24 respectively, the ends of a compression spring 25 are mounted. The sockets 22 and 24 are on the sides of the arms 13 and 15 opposite to the posts 17, and thus the spring 25 coöperates with the spring 19 in maintaining the normal rigidity of the supporting arm comprising the arms 13 and short arm 15. Mounted in the free end of the arm 15 by means of bolts is an angle plate 26.

Secured by means of bolts in the free end of the arm 11 is a plate 27, the same having pivotally secured to its free end a short arm 28. Mounted between posts 29 on the arms 1. and 28 respectively is a spring 30. Secured in the free end of the arm 28 is a plate 31.

It will be understood that in supporting a fender in proper position in front of a vehicle, two or more of the frames as above described, are required, the same being attached by means of the clips 1 to the axle 2 at suitable points. In order to strengthen the assembly of said frames, a cross bar 32 is secured to each of the arms 6 near the upper end thereof as shown in Fig. 2 of the drawings.

Our fender proper comprises a frame 33 of suitable outline, the same being constructed of metal piping; said frame carries a network comprising vertical wires 34 and horizontal wires 35, the latter being of smaller gage than the vertical wires. Openings may be left at suitable points so that the fender when mounted, will not obstruct the headlights.

The fender is secured to the frame by means of metal clips 37 and 38 engaging the top and bottom portions of the frame 33 respectively and being secured by means of plates 26 and 31 respectively of the frame.

It will be understood that various changes and alterations may be made in the details of construction above described, as for instance, in the mesh of the fender proper and in the details, arrangement and assembly of the several parts of the frame, all of which are within contemplation and considered by us as within the purview of the appended claims. The nature and operation of our new fender will be apparent to those skilled in the art from the foregoing description thereof. When the fender mounted as above set forth strikes an obstruction, the arm 11 is forced backward against the spring 12 turning pivotally on the plate 7 at the top of the frame work. In order to provide further resilience, the short arms 15 and 28 are permitted to move upon their pivotal mountings against the operation of the springs 19 and 25 and spring 30 respectively. The fender may be thrown back out of the way by lifting the same, the arm 8 turning upon its pivotal mounting.

Having thus described our invention, what we claim as new and desire to secure by Letters Patent is:

1. A device of the character described, comprising members arranged to be secured to the front of a vehicle, upwardly extending arms on said members, frames pivotally secured to the upper ends of said arms, means for placing the lower portions of said frames under tension, and a fender supported by said frames in front of said vehicle substantially as and for the purpose described.

2. A device of the character described comprising members arranged to be secured to the front of a vehicle, upwardly extending arms on said members, frames pivotally secured to the upper ends of said arms, said frames comprising each an upwardly and a downwardly extending arm, means for placing the lower portions of said frames under tension, and a fender supported by the arms of said frames in front of said vehicle, substantially as and for the purpose described.

3. A device of the character described comprising members arranged to be secured to the front of a vehicle, upwardly extending arms on said members, frames pivotally secured to the upper ends of said arms, said frames comprising each an upwardly and a downwardly extending arm, short arms pivotally secured to the free ends of the arms of said frames, springs interposed between said arms and said short arms, means for placing the lower portions of said frames under tension, and a fender supported by the short arms of said frames in front of said vehicle, substantially as and for the purpose described.

SAMUEL SMITH.
RODERICK J. GALVIN.

Copies of this patent may be obtained for five cents each, by addressing the "Commissioner of Patents, Washington, D. C."